No. 778,821. PATENTED DEC. 27, 1904.
J. F. DURYEA.
CONNECTING ROD.
APPLICATION FILED MAR. 27, 1900. RENEWED MAY 12, 1904.
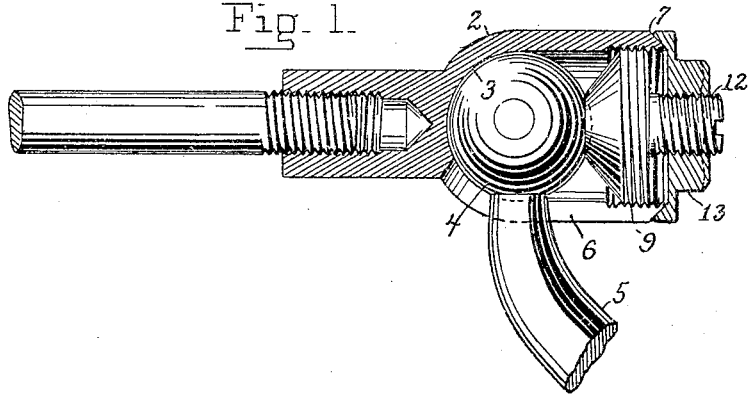
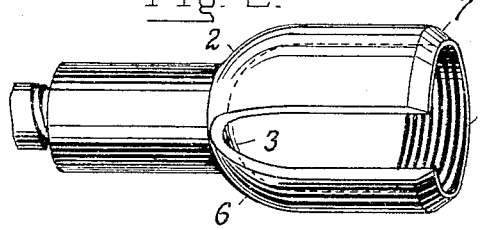 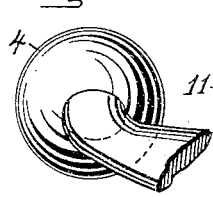 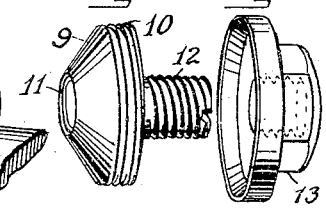
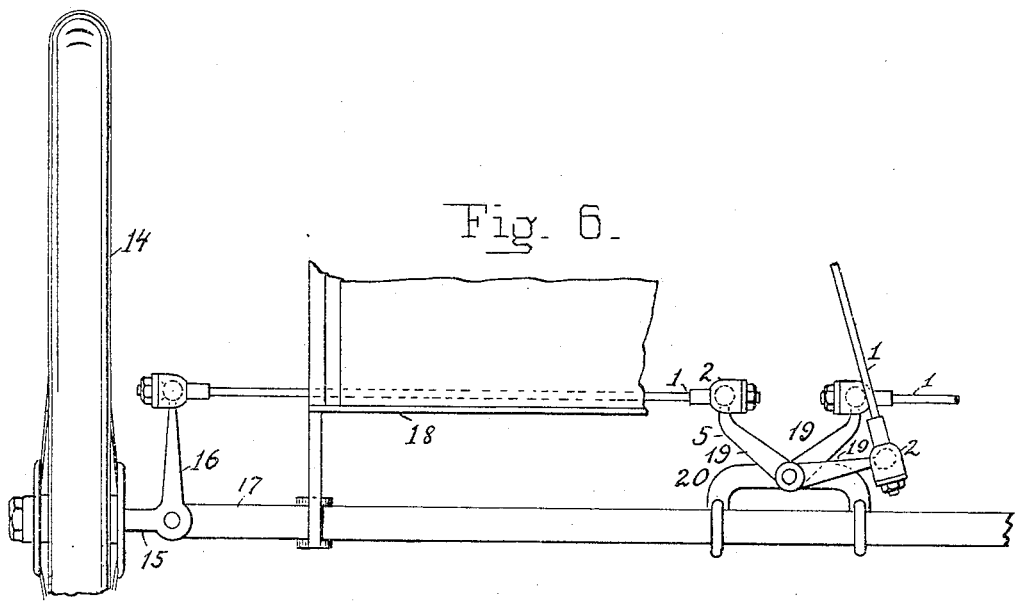
Witnesses:
Samuel W. Balch
W. Myron Reynolds
Inventor,
J. Frank Duryea,
By Thomas Ewing, Jr.,
Attorney No. 778,821.                                        Patented December 27, 1904.

UNITED STATES PATENT OFFICE.

JAMES FRANK DURYEA, OF SPRINGFIELD, MASSACHUSETTS.

CONNECTING-ROD.

SPECIFICATION forming part of Letters Patent No. 778,821, dated December 27, 1904.

Application filed March 27, 1900. Renewed May 12, 1904. Serial No. 207,695.

*To all whom it may concern:*

Be it known that I, JAMES FRANK DURYEA, a citizen of the United States of America, and a resident of Springfield, county of Hampden, State of Massachusetts, have invented certain new and useful Improvements in Connecting-Rods, of which the following is a specification.

This invention has for its object the improvement in the form of coupling-joint for the end of a connecting-rod which shall be of simple construction, capable of accurate adjustment, and to a limited degree universal in its action. It has been designed with especial reference to the requirements in a motor-vehicle for connecting the lever-arms of the steering mechanism; but it is equally applicable in almost any class of mechanism where rotary or reciprocating parts require to be connected by a rod and accurate alinement or parallelism of the axis cannot be assured. The joint is a ball-and-socket, and the improvements relate to the way in which it is constructed and adjusted.

In the accompanying sheet of drawings, which form a part of this specification, Figure 1 shows the end of a connecting-rod constructed in accordance with this invention, the socket and lock-nut being shown in section and an arm with a ball end being shown in engagement with the socket. Fig. 2 is a perspective view of the socket at the end of the connection-rod. Fig. 3 is a perspective view of the ball on the end of an arm. Fig. 4 is a perspective view of the plug which screws into the end of the socket. Fig. 5 is a perspective view of the lock-nut. Fig. 6 is a plan view of the forward end of a motor-vehicle and one running-wheel partly broken away, showing the manner of applying the connecting-rods to the steering mechanism.

The connection is screwed to the end of a rod 1 and consists of a cup-shaped socket 2, the axis of which is in line with the rod. The inside bottom 3 of the socket is hollowed hemispherically to the shape of the ball 4, which is mounted at the end of the arm 5. The side of the socket is slotted at 6 to admit the passage of the arm, and the slot is slightly wider than the arm to give the necessary freedom of movement. The exterior of the socket at the mouth is a cone 7, and internally at the mouth is a thread 8, into which a plug 9 is screwed. A thread 10 on the plug engages with the thread in the socket. The front end 11 of the plug is hollowed to the shape of the ball; but the hollowed part is of less diameter than the end of the plug, since the edges of the plug are beveled back to give the necessary play to the arm. At the back of the plug is a threaded stem 12, which carries a lock-nut 13.

Around the edge of the lock-nut is a projecting rim, which closes the mouth of the socket and secures it against spreading. The nut also locks the plug against unscrewing. Since the axis of the socket is in line with the rod and the plug adjusts in the direction of this axis, the adjustment is in the direction of the greatest wear.

Three connecting-rods which have each end constructed as above described are shown in Fig. 6 in connection with the steering mechanism of a motor-vehicle. The forward wheels 14 of the vehicle, of which only one is shown, are mounted on short axles 15, with rearwardly-projecting arms 16. These axles, of which only one is shown, are connected by hinges to a transverse bar 17. This bar supports the body 18 of the vehicle. A lever with three arms 19 is hinged to a bracket 20, which is bolted to the transverse bar opposite its middle point. Two of the connecting-rods 1 connect two of the arms 19 with the arms 16 of the wheel-axles. The third connecting-rod 1, which is for steering, leads from the body of the vehicle to the third arm 19 of the lever.

What I claim as new, and desire to secure by Letters Patent of the United States, is—

1. A connecting-rod having at its end a cup-shaped socket, interiorly threaded at its mouth and a longitudinal slot in the wall of the socket which extends to the mouth thereof, a threaded plug screwed in the socket and a lock-nut threaded to the plug and having a projecting rim which engages the mouth of the socket to secure it against spreading, in combination with a ball and supporting-arm therefor, substantially as described.

2. A connecting-rod having at its end a cup-shaped socket interiorly threaded at its mouth and a longitudidal slot in the wall of the socket which extends to the mouth thereof, a threaded plug, having a beveled inner end centrally hollowed and a threaded stem upon its outer end, secured in the socket, and a lock-nut threaded to the stem and having a projecting rim which engages the mouth of the socket, to prevent it from spreading, in combination with a ball and supporting-arm therefor, substantially as described.

Signed by me in New York city, borough of Manhattan, this 26th day of March, 1900.

J. FRANK DURYEA.

Witnesses:
 THOMAS EWING, Jr.,
 SAMUEL W. BALCH.